Dec. 2, 1958   R. E. SMITH   2,862,524
REINFORCED PLASTIC ARTICLE
Filed Oct. 5, 1954
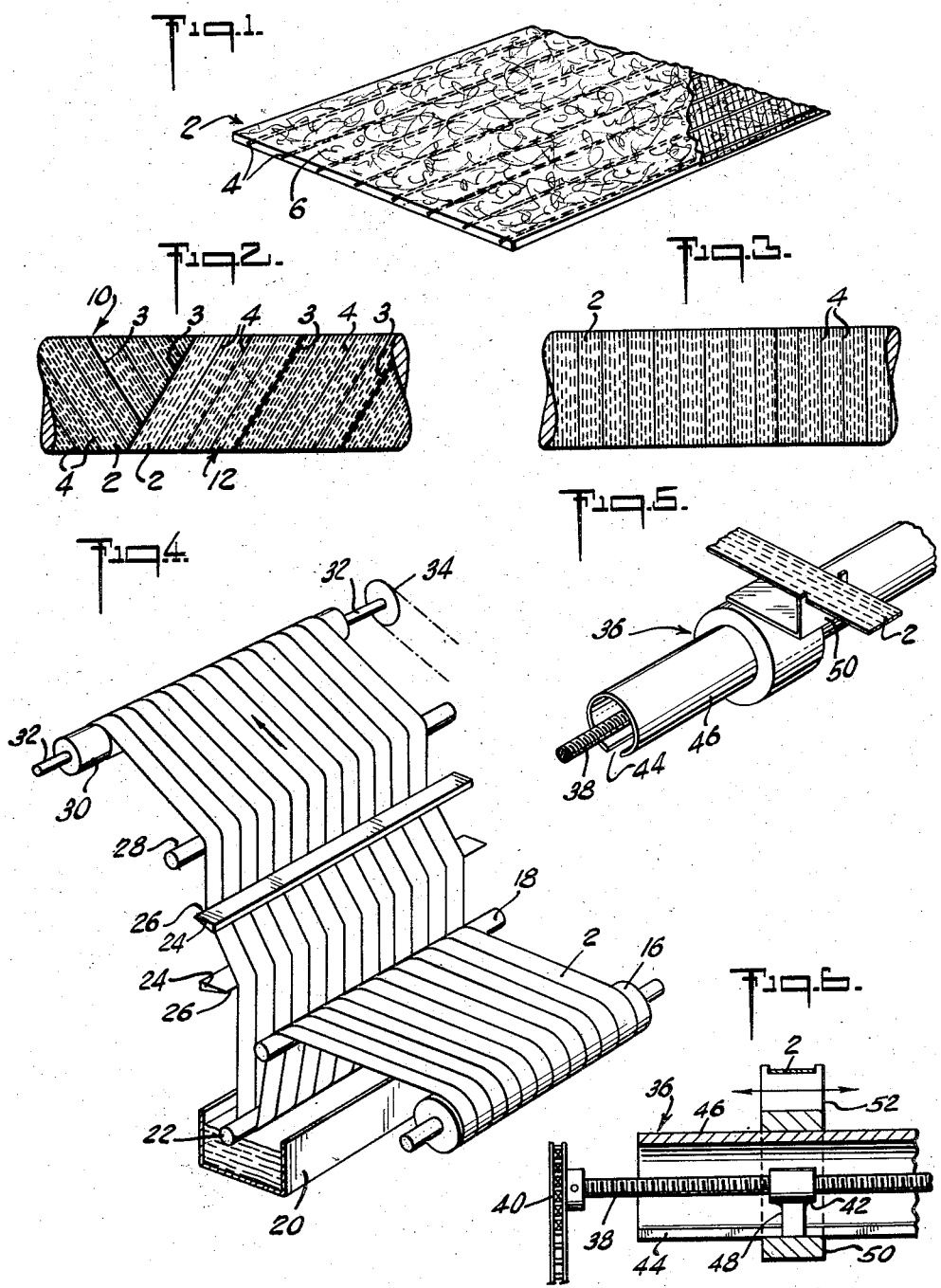
INVENTOR
ROBERT E. SMITH
BY
ATTORNEY

United States Patent Office 2,862,524
Patented Dec. 2, 1958

2,862,524

REINFORCED PLASTIC ARTICLE

Robert E. Smith, Linden, N. J., assignor to Johns-Manville Corporation, New York, N. Y., a corporation of New York Application October 5, 1954, Serial No. 460,451

11 Claims. (Cl. 138—76)

This invention relates to hollow circular articles and methods of making the same, and is particularly concerned with articles such as fiber-reinforced plastic pipe. While the principles of the invention will be explained with relation to such pipe, it will be understood that these principles are applicable to other hollow circular articles as well.

In the manufacture of fiber-reinforced plastic pipe, at the present time the principal reinforcement used is filamentary glass media in the form of rovings, yarns, mats, cloth, etc., or combinations thereof, but to date no really satisfactory pipe of this type has been produced. One problem in this field is to find a fibrous reinforcing media which is relatively thin and strong and so constructed as to result in no unreinforced areas (even very small areas) in the finished pipe. Another problem in this field is to eliminate the present failures of pipe or the occurrence of pin hole leaks therein when the pipe is tested under hydrostatic pressure of 300 p. s. i. at 200° F., for example, for a relatively short period.

It is proposed to solve the above problems in the present invention by employing a general method of forming the pipe, which method comprises interfelting and embedding glass filaments (in any of the forms heretofore employed) with and in asbestos fiber to form a web, impregnating the web with a resinous binder, arranging the material of the web in hollow circular form, and then setting the binder. By interfelting and embedding the glass filaments with and in asbestos fiber it is meant that the glass filaments are incorporated within an asbestos felt during the felting process, whereby the asbestos fiber becomes intimately felted with the glass filaments when the glass filaments are embedded in the asbestos.

The advantages of interfelting the glass and asbestos may be best understood when explained in relation to glass cloth, but it will be apparent that the same principle applies in varying degrees to other forms of glass media, such as that shown in the drawing. With a glass cloth the openings in the weave result in small, relatively unreinforced areas, and a proposal has been made to eliminate these unreinforced areas by employing a supplementary reinforcing sheet laminated with the glass, the sheet being substantially nonforaminous. This results, of course, in a reinforcing medium having a thickness which is the sum of the thicknesses of the glass media and the sheet and, moreover, results in a reinforcement wherein not only are the openings in the glass media backed up, but also the glass yarns of the media are unnecessarily backed up. Where asbestos fiber is interfelted with glass media, the asbestos fills the openings in the media but covers the surfaces thereof only sufficiently to form a continuous web of asbestos which results in a reinforcing medium wherein the glass itself is not unnecessarily reinforced and the supplementary reinforcement (asbestos) is mechanically locked to the glass, thus preventing delamination. Such a medium can be made thinner, yet stronger than other media now in use.

My invention will be more fully understood and further objects and advantages thereof will become more apparent when reference is made to the following detailed description and to the accompanying drawings in which:

Fig. 1 is an isometric view of one form of a fiber-reinforcing media forming a part of the present invention;

Fig. 2 is an elevation of a hollow circular article formed in accordance with the present invention;

Fig. 3 is an elevation of a hollow circular article differing from the article of Fig. 2;

Fig. 4 is a schematic illustration of an apparatus for forming the article of Fig. 3;

Fig. 5 is an isometric view of a portion of an apparatus for forming the product of Fig. 2; and, Fig. 6 is a sectional view of the apparatus of Fig. 5.

Referring to Fig. 1, there is shown a web 2 of fibrous reinforcing media, the web consisting of longitudinally extending yarns of glass filaments 4 embedded in a felt 6 of asbestos fiber. While the glass filaments have been illustrated as being in the form of parallel yarns, they obviously may be incorporated in the web 2 as other types of parallel groups of filaments, such as rovings, and also may be in the form of woven or unwoven fabric, although, in general, fabrics will be found more expensive. Where spaced parallel groups of glass filaments are employed they are preferably arranged to extend longitudinally of the web, and where fabrics are employed, at least some of the fibers are preferably arranged in the same direction, although it will be understood that for particular purposes it may be desirable to employ some other orientation of the filaments. The asbestos felt portion of web 2 is of the same general character as commercial felts, such as the 10 lb. 25 mil felt used commercially as a carrier for asphalt in making protective coverings. Obviously, however, the process of forming web 2 differs from the conventional process of forming felt 6 alone, in that the asbestos fiber is felted around the glass fiber media which thus may be said to be interfelted with and embedded in the asbestos fiber. The combined web 2 is substantially no thicker than a corresponding asbestos felt. It should be noted that the showing of asbestos fiber in the drawings is only for the purpose of indicating a more or less random arrangement of a significant portion of the asbestos, and should not be considered as an accurate illustration of the fiber.

In Fig. 2 there is illustrated a hollow circular article or pipe section formed by winding a plurality of layers 10 and 12 of web 2 helically around a cylindrical mandrel after impregnating the web with a resinous binder. In Fig. 3 there is illustrated a hollow circular article or pipe section formed by winding web 2 circumferentially around a cylindrical mandrel after impregnation with such a binder. While in the article of Fig. 2 the web 2 is wound helically around the article with edge 3 of each convolution partially overlapping the preceding convolution, and in the article of Fig. 3 the web 2 is wound circumferentially with substantially complete overlapping of convolutions, in both articles the web may be said to have been wound "peripherally" around the article.

The resinous binders which may be employed in accordance with the present invention are any of those thermoplastic or thermosetting resins heretofore used in making hollow circular articles, the more extensively employed resins being polyesters, epoxies and phenolics. Where conventional polyester resins are used, the glass filament reinforcement, even though embedded in the asbestos felt, may be somewhat visible in the finished product and consequently the glass media is illustrated as visible in Figs. 2 and 3. The selection of a particular resin for a product obviously depends upon the uses to which the product is to be adapted, and such considerations will be well understood by those skilled in the art.

In Fig. 4 there is shown, schematically, an arrangement whereby the product of Fig. 3 may be produced. As illustrated, web 2 in this instance is as wide as the length of pipe to be produced and is supplied on a roll 16 from which it is fed over roller 18 into resin bath 20. The web then extends under a roller 22 positioned in the bath and between wiping bars 24 having offset wiping edges 26 so arranged as to firmly contact the web and remove excess resin therefrom. From wiping bars 24 the web proceeds over a third roller 28 and around a mandrel 30 supported on shafts 32 and rotated by any conventional means, such as chain and sprocket 34.

In Figs. 5 and 6 there is illustrated a mechanism which may be interposed between the roller 28 and mandrel 30 in the apparatus of Fig. 4 when it is desired to employ that apparatus for producing the article of Fig. 2. The apparatus of Figs. 5 and 6 constitutes a traversing mechanism 36 which includes a worm 38, driven by any conventional means such as chain and sprocket 40, and a worm follower 42 extending through a slot 44 in the lower side of a housing 46, the worm follower being connected by bar 48 to a collar 50 carrying, at the upper side thereof, a guide means 52. The guide means 52 is provided with a notch or other means for engaging the web 2 whereby, upon actuation of the traversing mechanism, the guide means causes the web to be moved in the direction of the mandrel axis to wind the web helically around the mandrel. The traversing mechanism is preferably so arranged as to be automatically reversible, such mechanisms being of conventional construction and hence not illustrated. If desired a variable speed drive can be provided for the traversing mechanism whereby successive layers 10 and 12 of material, in the article of Fig. 2, may be arranged with the longitudinally extending glass filaments oriented at different angles to the axis of the article.

In producing the articles of this invention a mandrel is placed in the forming apparatus and is treated with any known substance for preventing a strong bond between the mandrel and the pipe to be formed. Since the anti-bonding substance required depends upon the resin employed, and since such substances are well known in the resin art, they need not be tabulated here. After a pipe of the desired thickness has been formed on the mandrel, there is preferably applied to the outer surface of the pipe a sheet of covering material such as cellophane. The resin is then cured in the appropriate manner after which the cellophane is removed.

As indicated above the articles of the present invention may consist of any desired number of layers of reinforcing media and may have the media oriented in any desired manner. In the article of Fig. 2 it will be noted that one layer of reinforcing media consists of the media laid down by one traverse of the mechanism of Figs. 5 and 6, and the next layer consists of media laid down by the return traverse. Where the glass filament media extends longitudinally of the web, as illustrated in Fig. 1, it may be desirable to arrange pairs of layers, such as layers 10 and 12 at opposite equal angles, and successive pairs of such layers at different opposite but equal angles. Also, the web may be formed or cut so as to be applicable to the mandrel with parallel groups of filaments extending parallel to the axis of the mandrel, so as to provide longitudinal reinforcement in the pipe. Such reinforcement can be provided in combination with any of the orientations disclosed herein.

It is apparent that the articles of the present invention differ from previous articles of this same general type in several important respects. Since the reinforcing web consists of glass filaments interfelted with and embedded in an asbestos felt, no reliance is placed upon a firm bond between resin and glass in the finished product, whereas with prior articles such a bond is relied upon to prevent delamination or other failures of the pipe wall. The articles of the present invention are the first articles in which a reinforcing web of glass and asbestos has been used and in which asbestos is laminated to asbestos in the successive layers of the article, rather than glass to glass or glass to asbestos. As indicated above, the relatively short, weak asbestos felted in the openings in the glass media and surrounding the glass filaments apparently provide a stronger reinforcement of the open area in the glass than in prior constructions.

Having thus described my invention in rather full detail it will be understood that these details need not be strictly adhered to but that various changes and modifications may suggest themselves to one skilled in the art, all falling within the scope of the invention as defined by the subjoined claims.

What I claim is:

1. A hollow circular article comprising fibrous reinforcing media impregnated with a resinous binder, said media comprising a peripherally wound web of asbestos fibers having glass filaments interfelted therewith and embedded therein.

2. A hollow circular article comprising a plurality of layers of fibrous reinforcing media impregnated with and bonded together by a resinous binder, said media comprising a peripherally wound web of asbestos fibers having glass filaments interfelted therewith and embedded therein and extending longitudinally thereof.

3. A hollow circular article comprising a plurality of layers of fibrous reinforcing media impregnated with and bonded together by a thermosetting resin in the infusible insoluble state, said media comprising a peripherally wound web of asbestos fibers having glass filaments interfelted therewith and embedded therein and extending longitudinally of the web.

4. The article defined in claim 1, wherein the glass filaments constitute an unwoven fabric.

5. The article defined in claim 1, and including glass filaments extending axially of the article.

6. The article defined in claim 3, wherein the glass filaments are arranged in spaced parallel groups of filaments.

7. The article defined in claim 3, wherein the glass filaments are in the form of parallel yarns.

8. The article defined in claim 3, wherein the longitudinally extending glass filaments constitute a portion of a fabric.

9. The article defined in claim 3, wherein the peripherally wound web is helically wound.

10. The article defined in claim 3, wherein the peripherally wound web is circumferentially wound.

11. The article defined in claim 3, wherein said reinforcing media includes webs wound with said longitudinally extending filaments at varying angles to the axis of the article.

References Cited in the file of this patent

UNITED STATES PATENTS

| | | |
|---|---|---|
| 1,928,699 | Neal | Oct. 3, 1933 |
| 2,230,271 | Simpson | Feb. 4, 1941 |
| 2,467,999 | Stephens | Apr. 19, 1949 |
| 2,525,070 | Greenwald et al. | Oct. 10, 1950 |
| 2,594,693 | Smith | Apr. 29, 1952 |